Aug. 5, 1952 J. DAUGHERTY 2,605,656
MACHINE TOOL
Filed Oct. 30, 1946 2 SHEETS—SHEET 2

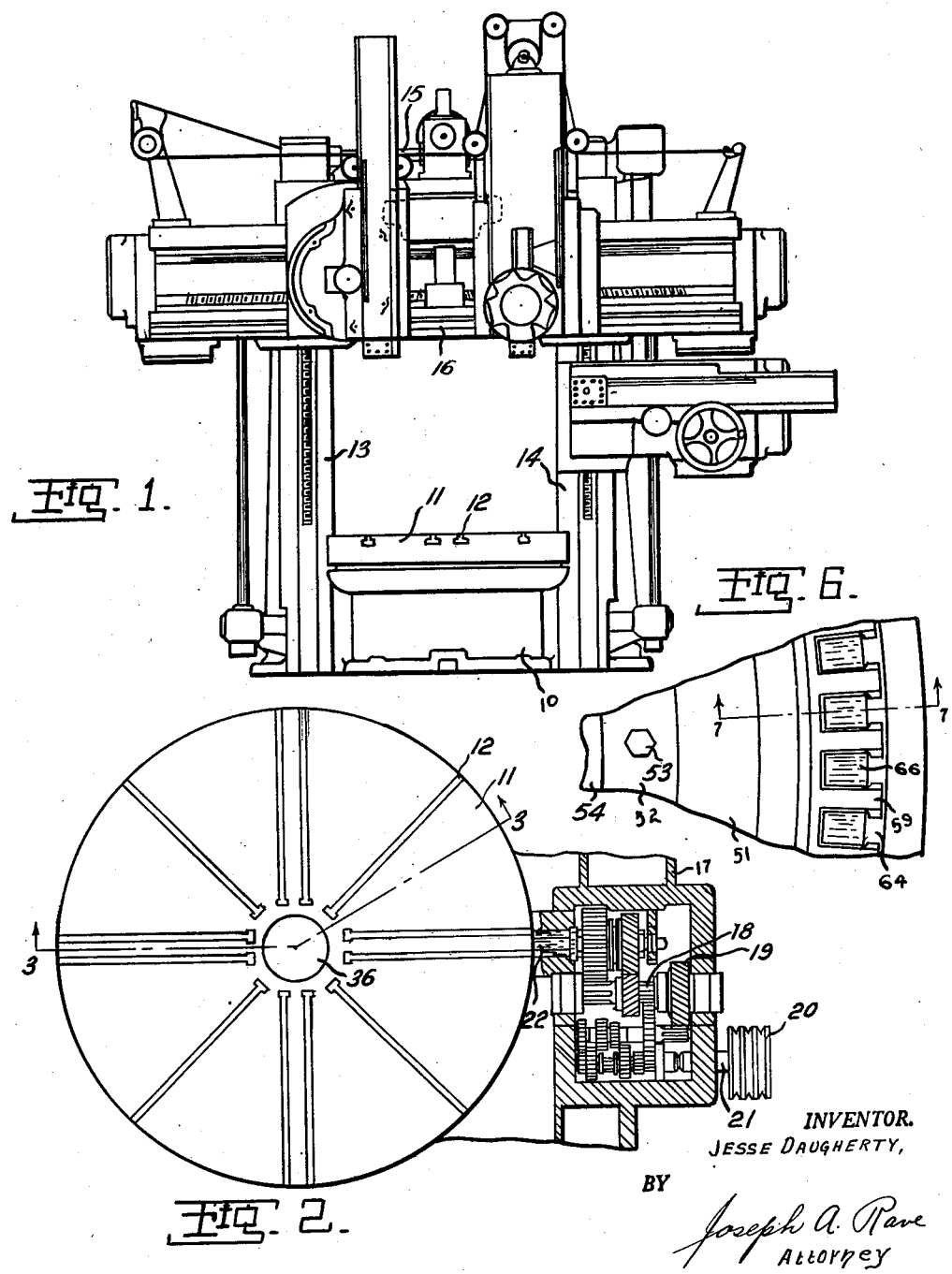

INVENTOR.
JESSE DAUGHERTY
BY
Joseph A. Rave
Attorney

Patented Aug. 5, 1952

2,605,656

UNITED STATES PATENT OFFICE 2,605,656

MACHINE TOOL

Jesse Daugherty, Cincinnati, Ohio, assignor, by mesne assignments, to Giddings & Lewis Machine Tool Company, Fond du Lac, Wis., a corporation of Wisconsin Application October 30, 1946, Serial No. 706,704

2 Claims. (Cl. 77—63)

This invention relates to improvements in machine tools and particularly to improvements in mounting means or supporting means for rotating tables, such for example, the rotating table of a boring mill.

The invention will be described with respect to a boring mill but it is to be understood that it has equal application to any structure wherein a rotating table or member is to be supported for rotation.

Boring mills are adapted to operate on relatively large and heavy work pieces overhanging the center of the table from two to four feet and upstanding from said table an equal amount. The cutting tools of a boring mill, operating on the uppermost surface and outermost corners of the work, exert considerable leverage causing the table, unless properly mounted, to be tilted or canted with the result the finish cut is not accurate.

In an attempt to hold the table in proper relation to its bed, resort, in the past, has been had to spindle bearings that of necessity were quite long and in some instances projected below the table supporting bed into a pit, which construction was objected to for various and obvious reasons. Other attempts were in the nature of hold down clamps carried by the table and cooperating with a ledge on the bed, or conversely, arranging the hold down clamps on the bed to cooperate with a ledge on the table. Even this construction permitted a small amount of canting or table misalignment with the result of small but still imperfections on the resulting work. Still other attempts at solving the problem took the form of anti-friction radial bearing for a table spindle together with thrust race ways between the table and bed but this construction caused the generation of too great a friction between the race ways requiring an excessive amount of power for rotating the table and a warping of the table due to the friction heat generated by the race ways metal to metal contact.

By the present invention there is provided a construction which adequately supports the table against canting or deflection while permitting it to be readily rotated with a normal use of power.

It is, therefore, the principal object of the present invention to provide a rotating table mounting or support wherein the table rotates about its axis without objectionable canting and friction regardless of weight or pressure applied thereto.

Another object of the present invention is the provision in a machine tool of means for mounting a rotating work supporting table that it may be readily and adequately rotated.

A still further object of the present invention is the provision of an anti-friction mounting for a rotating table of a machine tool whereby the table may be freely rotated and at the same time have its axis vertical regardless of weight or pressure applied to the table.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a front elevation of a boring mill having embodied therein the improvements of the present invention.

Fig. 2 is a plan view of the work supporting table and the mechanism for effecting the rotation of said table.

Fig. 6 is a fragmentary horizontal sectional view through another form of anti-friction roller or thrust bearing from that illustrated in Fig. 3.

Throughout the several views of the drawings similar reference characters are employed to denote the same or similar parts.

Figures 3, 4:
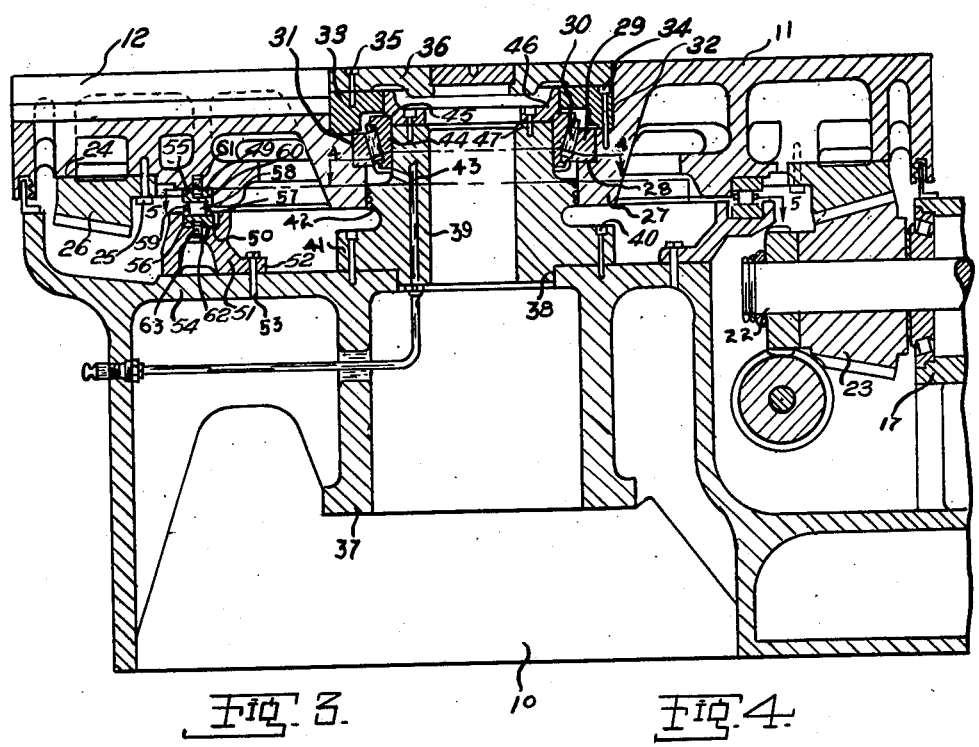
Fig. 3 is an enlarged transverse sectional view through the table as seen from line 3—3 on Fig. 2.
Fig. 4 is a fragmentary horizontal sectional view through the radial anti-friction bearing of the table as seen from line 4—4 on Fig. 3.

As was noted above, this invention has application in any instance where the mounting of a rotating table is the point in question and such an instance is the mounting of the work supporting table of a boring mill and it is in connection with this specific instance that the invention will be described.

Accordingly, and as seen in Fig. 1, the boring mill comprises a bed 10 having mounted thereon, through means to be subsequently described, a table 11 having T slots 12 through which the work is fastened to the table. Upstanding on either side of the bed 10 and table 11 are uprights 13 and 14 connected to one another at their upper end by means of cross member 15. On the uprights 13 and 14 is the rail 16 which, along with the uprights 13 and 14, supports the various tool heads that carry tools for operation on the work on the table 11.

The bed 10, in the specific machine illustrated in the drawings, has projecting rearwardly thereof a housing or gear box 17 in which is mounted a variable-speed drive comprising a plurality of shafts 18 each having secured to it for rotation therewith gears or pinions 19 which in some instances are fixed and in other instances are slidable to effect various gear ratios and thereby different speeds at the outlet end of the gear box while having a constant speed at the inlet end thereof. The inlet or initial speed is obtained through the multiple V-belt pulley 20 belted to a driving motor (not shown) and which pulley 20 is keyed or otherwise secured to the pulley shaft 21 forming one of the shafts in the change speed train in the gear box or housing 17. The final shaft 22 of the change speed train has keyed or otherwise secured to it a bevel pinion 23, which is located beneath the rim of the work supporting table as shown most clearly in Fig. 3.

The foregoing description of a boring mill and its table together with the drive of the table is well known and has been here briefly described to present the proper environment for the present invention.

The work supporting table 11 is provided on its underside inwardly of its periphery with a seat 24 to which is securely fastened, as by bolts 25, a bevel ring gear 26 that meshes with the bevel driving pinion 23. Centrally of the table and depending therefrom is a circular boss 27 provided with a counterbore 31 to form a seat 28 on which is disposed one side of outer race 29 of an anti-friction bearing, indicated in general by the reference numeral 30. The anti-friction bearing 30 is a combined radial and thrust bearing and hereinafter will be so designated. Above the counterbore 31 the table 11 is provided with a second counterbore 32 in which is disposed outer bearing race covering ring 33 secured to the table in said counterbore 32 by bolts 34. The ring 33, in turn, has secured to it as by screws or bolts 35 a closure member or plate 36.

The bed 10 is provided interiorly thereof with a transverse rib or shelf 54 from which depends, on the axis of the table 11, a sleeve like protuberance 37 receiving in the upper end thereof, the reduced end 38 of a stationary spindle 39. The stationary spindle 39 may be designated as a spindle stub and is secured to the table rib or shelf by screws or bolts 40 extending through a radial flange 41 thereof which projects beyond the reduced end 38. Upwardly of the radial flange 41, the stationary spindle or spindle stub 39 is provided with a radial bearing 42 having its periphery closely adjacent the inner wall of the bore 43 in the table depending sleeve or protuberance 27. Above the radial bearing 42 the spindle or spindle stub 39 is reduced to receive, the inner race 44 of the anti-friction bearing 30. The said inner race 44 of the anti-friction bearing 30 has its upper end received in a seat 45 formed in bearing preloading member 46 secured to the upper end of the stationary spindle or spindle stub 39 by screws, bolts or the like 47. The preloading member 46 is adapted to be received in the bore of race covering ring 33 and has a running fit therewith. Adjustment of the screws or bolts 47 causes the preloading member 46 to be actuated downwardly and which movement through its shoulder or seat 45 on the inner bearing race 44 forces the outer bearing race 29 against the table race supporting seat 28 and thereby preloads or removes all play and looseness between the outer and inner races 29 and 44 to establish on the anti-friction rollers 48 of the radial-thrust bearing 30 the necessary and desired load. By this construction the table 11 is positively held to rotate about its intended or desired axis with no deflection therein under work pressure or cutting loads.

In order to further support the table it is provided adjacent to, but inwardly of, the driving bevel gear 26 with a seat or race way 49 which is opposed to a race way 50 formed in the upper surface of a ringlike bracket 51. The bracket 51 is provided with an inwardly projecting radial flange 52 through which pass screws or bolts 53 for securing the bracket 51 to the table 10 specifically, to the shelf, or rib 54 interiorly of said table 10.

Mounted on the race ways 49, of the table 11, and 50, of the bed 10, is, respectively, the upper race 55 and lower race 56 of anti-friction thrust bearing, indicated in general by the reference numeral 57. The anti-friction bearing 57 has between the upper and lower races 55 and 56 anti-friction rollers 58 which are retained in relative operating positions by usual cage 59.

In order to retain the anti-friction thrust bearing 57 in operative position, that is, prevent creeping of the races 55 and 56 relative to their race ways 49 and 50, the upper race 55 is provided at one point with a socket 60 receiving therein a pin 61 depending from the table 11, and, similarly, the lower race 56 is provided with a socket 62 receiving the end of a pin 63 upstanding from the bracket 51.

It should be noted that the thrust bearing 57 should be made as large in diameter as practicable as the nearer the perimeter of the work supporting table it is located the greater the stability therein without over-loading the radial-thrust bearing 30. It will be evident that by preloading the anti-friction radial and thrust bearing 30 through adjustment of the member 46, a preload is also imposed on the outer anti-friction thrust bearing 57.

Figures 5, 7:
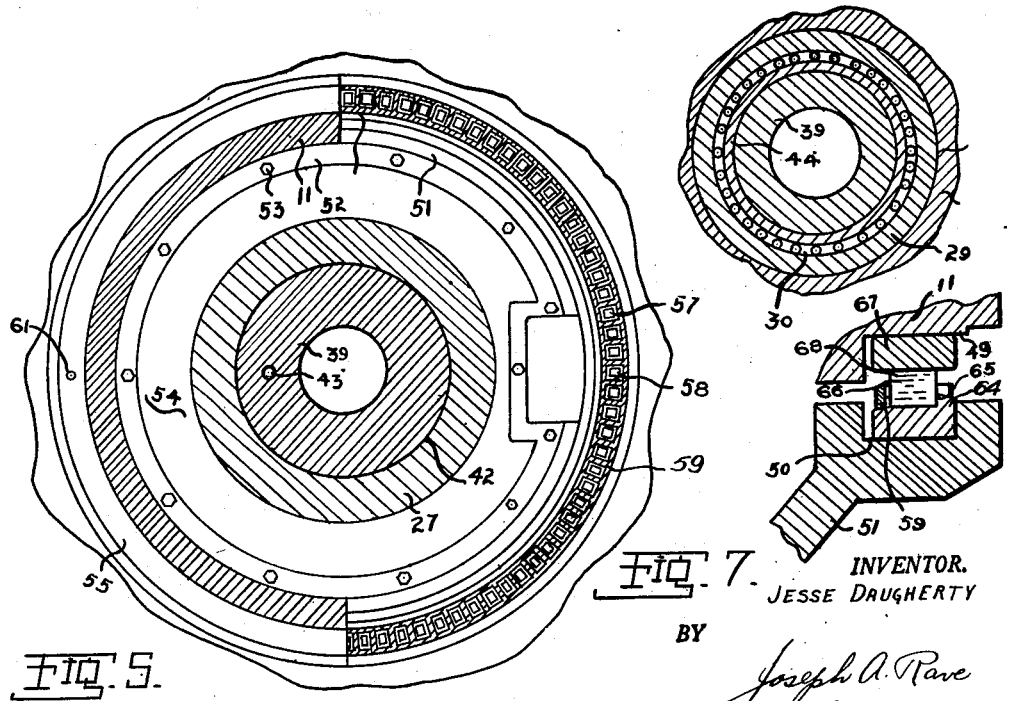
Fig. 5 is a fragmentary horizontal sectional view through a second anti-friction or thrust bearing taken in a plane below that of Fig. 4 on line 5—5 on Fig. 3.
Fig. 7 is a vertical sectional view through the form of thrust bearing illustrated in Fig. 6 as seen from line 7—7 on said Fig. 6.

The disclosure in Figs. 3 and 5 is of a cylindrical type of anti-friction roller bearing member which has proven quite successful even though, theoretically, not giving the best rolling support in a circular path. In Figs. 6 and 7 is illustrated the use of an anti-friction thrust bearing in which use is made of tapered rollers. As shown in said Figs. 6 and 7 use is made of lower race 64 having formed therein a recess to provide a shoulder 65 against which the anti-friction members or tapered rollers 66 have end abutment. Above the anti-friction members or tapered rollers 66 is the usual upper bearing race 67. This tapered roller anti-friction thrust bearing is indicated, in general by the reference numeral 68.

It will be noted that the said bearing races 64 and 67, are respectively, mounted on the bed race way 50 and work supporting table race way 49 and said bearing races 64 and 67 retained against independent movement with respect to their race ways by the means described above in connection with the thrust bearing races 55 and 56, or any other suitable or desirable means may be employed for this purpose.

The thrust bearing 57 or 68 is adapted to minimize the friction between the work supporting table and bed and therefore the tendency to hold the table against rotation due to the heavy preloading of the radial-thrust bearing 30, in other words, previous attempts to effectively preload the radial-thrust bearing 30 has resulted in so much friction between the table and bed, through plane metal to metal bearings at the points of thrust bearing race supports 49 and 50, that the table 11 was held against movement, or an uneconomical amount of power was required to move the table, or the friction heat generated by the metal to metal plane bearing contacts was so great that the table 11 was distorted and the previous attempts at radial bearing preloading abandoned. With the use of the anti-friction thrust bearing 57 or 68 a successfully operating machine has been provided and the results beyond the obvious.

From the forgoing it will now be appreciated that there has been provided a construction which obviates the objections of previous constructions and which accomplishes the objects initially set forth.

What is claimed is:

1. In a machine tool organization, in combination, a bed having a horizontally disposed shelf adjacent its upper end, an upstanding spindle rigid with said shelf, a generally circular work supporting table, said table having a centrally disposed annular depending portion concentric with and extending over the upper end of said spindle, means supporting said table on said bed for rotation about the axis of said spindle, said supporting means including an anti-friction thrust bearing comprising an upper bearing ring and a lower bearing ring with anti-friction members therebetween, said upper and lower rings being respectively received in a raceway formed on the lower face of said table concentric with and spaced substantially from the table axis and an opposed raceway on the upper face of said shelf concentric with and spaced from the axis of said spindle, concentric opposed cylindrical bearing seats respectively formed on said spindle and on the depending portion of said table, the bearing seat on the table terminating at its lower end in an inwardly projecting upwardly facing shoulder, a combined radial and thrust bearing comprising inner and outer race rings with a single row of anti-friction bearing elements interposed therebetween, said inner race ring seating on the bearing seat on said spindle and said outer race ring seating on the bearing seat on the depending table portion, an annular member mounted on the upper end of said spindle, said member having an outer diameter larger than the diameter of the spindle and defining a shoulder engageable with the upper end of said inner race ring, means securing said annular member to said spindle for adjustment vertically thereon to compress the combined bearing against the shoulder on the depending portion of the table and thereby preload the same and preload the first mentioned thrust bearing, and power operated means including a ring secured to the underside of said table between its peripheral edge and the raceway of said thrust bearing for rotatably driving the table.

2. In a machine tool organization, the combination of a bed having a horizontally disposed shelf adjacent its upper end, an upright spindle rigid with said shelf, a generally circular work supporting table, said table having a centrally disposed annular depending portion concentric with and extending over the upper end of said spindle, means supporting said table for rotation about the axis of said spindle, said supporting means including an anti-friction thrust bearing comprising an upper bearing ring and a lower bearing ring with anti-friction members interposed therebetween, said upper and lower rings being respectively received in a raceway formed on the lower face of said table and an opposed raceway formed on the upper face of said shelf, concentric opposed cylindrical bearing locating surfaces respectively formed on said spindle and on the depending portion of said table, the locating surface on the table terminating at its lower end in an inwardly projecting upwardly facing shoulder, an annular member mounted on said spindle defining a downwardly facing and radially outwardly projecting shoulder adjacent the upper end of the locating surface of said spindle, a combined radial and thrust bearing interposed between said two locating surfaces and said two shoulders, said combined bearing comprising inner and outer race rings with a single row of axially elongated anti-friction bearing elements interposed therebetween, said inner race ring seating on the locating surface on said spindle and against the shoulder defined by said annular member, and said outer race ring seating on the locating surface on the depending table portion and against the shoulder at the lower edge of that surface, and means securing said annular member to said spindle for adjustment vertically thereon to force the radial and thrust bearing down against the shoulder on the depending table portion and thereby preload that bearing and through the shoulder on the table portion to said table simultaneously preloading said thrust bearing.

JESSE DAUGHERTY.

REFERENCES CITED

The following references are of record in the file of this patent:

UNITED STATES PATENTS

| Number | Name | Date |
|---|---|---|
| 434,475 | Simonds | Aug. 19, 1890 |
| 817,992 | Rowland | Apr. 17, 1906 |
| 2,068,523 | Trosch | Jan. 19, 1937 |
| 2,114,911 | Burt | Apr. 19, 1938 |
| 2,183,362 | Zimmerman | Dec. 12, 1939 |

FOREIGN PATENTS

| Number | Country | Date |
|---|---|---|
| 353,992 | Italy | Nov. 6, 1937 |